April 2, 1946.   R. D. MC DILL   2,397,902
CULINARY UTENSIL
Filed April 27, 1944
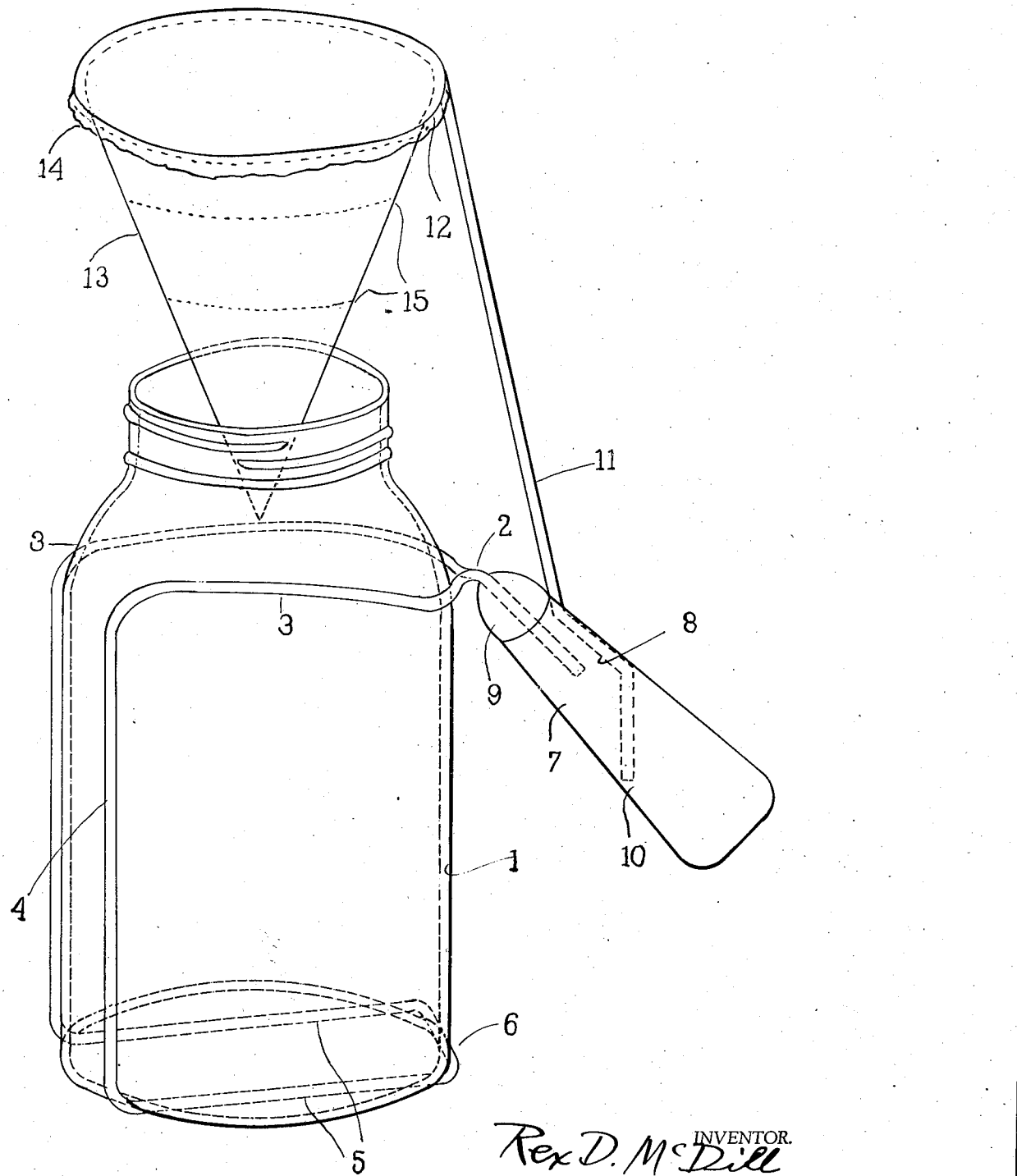
Rex D. McDill INVENTOR.
BY Hawgood and Van Horn
His Attorneys Patented Apr. 2, 1946

2,397,902

UNITED STATES PATENT OFFICE 2,397,902

CULINARY UTENSIL

Rex D. McDill, Cleveland Heights, Ohio

Application April 27, 1944, Serial No. 532,943

2 Claims. (Cl. 99—316)

This invention relates to culinary utensils and particularly to such utensils as are used in the preparation of beverages, being especially adaptable to the making of coffee.

An object of the invention is to provide an improved culinary utensil which will preserve the flavor of a beverage being produced.

Another object is to provide an improved glass coffee pot which may be readily and economically replaced.

Another object is to provide a frame for fitting on an ordinary Mason jar which will convert said jar into a highly efficient coffee pot.

Another object is to provide an improved culinary utensil which will be simple to use.

Another object is to provide an improved culinary utensil which may be easily kept clean and sanitary.

Another object is to provide an improved culinary utensil which will be composed of few and simple parts.

Another object is to provide an improved culinary utensil which will be economical to manufacture.

Another object is to provide an improved culinary utensil which will be neat and attractive in appearance.

Other objects will hereinafter appear.

The invention will be better understood from the description of one practical embodiment thereof, illustrated in the accompanying drawing, in which the figure is a perspective view of a utensil intended for the making of coffee in small quantities, such as are customarily prepared in the home.

In the device illustrated, a container is shown at 1, this being illustrated as a conventional canning jar, such as is commonly known as a "Mason" jar.

The container is clamped within a frame formed of a single piece of heavy wire which extends from its ends 2 in the form of horizontal arcuate portions 3 which embrace the upper part of the jar, just above its cylindrical portion and where it commences its reduction in diameter to form the neck.

The wires extend vertically downwardly, as indicated at 4, being bent horizontally into two parallel bottom sections 5 passing under the bottom of the jar and turning into a transversely horizontal portion 6.

The ends 2 may be twisted together or otherwise secured, and are bent in a downwardly inclined direction, as indicated, being held within the upper end of an inclined handle 7 which may be of wood, plastic or other heat-insulating material.

The framework consisting of a bent wire (2, 3, 4, 5 and 6) is sufficiently resilient that it may be sprung around the jar or removed therefrom by springing the arcuate portions 3 away from each other to permit removal from the jar, and when in place firmly holds the jar by pressure upon the upper tapered portion of the latter applied by the arms 3 and tending to press or wedge the jar downwardly firmly upon the parallel horizontal portions 5 of the wire.

Along the top of the handle is a groove 8 extending from adjacent the ferrule 9 to a point nearly midway of the length of the handle, where it terminates in a vertical hole 10 extending through the handle from top to bottom.

Fitting into the groove 8 and hole 10 is an offset and downwardly bent end of a wire having an upwardly extending strut-like portion 11 terminating at its upper end in a nearly closed circular loop 12.

Supported by the loop is a conical container 13, conveniently made of a piece of fabric, such as outing flannel, and if of this material or other material having a nap, arranged with the nap on the upper inner side thereof.

This conical bag may be conveniently formed by stitching and provided with a hem or peripheral seam 14 along its upper edge which may be slid over the looped end 12 of the supporting strut.

The bag may also be provided with a plurality of lines 15 imprinted thereon or formed by lines of colored stitching to indicate the quantity of ground coffee or similar material which should be placed therein for a given quantity or number of cups of beverage which it is desired to produce.

The operation of the device in making coffee is extremely simple:

The parts being assembled as indicated in the figure, the bag 13 has poured into it a sufficient quantity of ground coffee to fill it to the line 15 which corresponds to the number of cups desired.

Boiling water is then simply poured into the bag and allowed to drip into the jar 1.

When the water has all passed into the jar, the user simply raises the strut 11 vertically, thus removing its bent and offset lower end from the notch 8 and hole 10.

It is now only necessary to pick up the jar by the handle 7 and pour the beverage out.

The use of the notch and hole in the handle for holding the strut permits not only a very readily detachable means of assembly, but firmly supports the strut against movement in any direction relative the handle, keeping the bag properly positioned above the neck of the container.

It will be observed that neither the coffee grounds nor the liquid coffee come in contact with any metal or any other material which can impair the flavor, and in actual practice the flavor is found greatly superior to that of coffee made by prior methods.

While I have described the illustrated embodiment of my invention in some particularity, obviously many others will readily occur to those skilled in this art, and I, therefore, do not limit myself to the precise details shown and described herein, but claim as my invention all embodiments, variations and modifications coming within the scope of the appended claims.

I claim:

1. A culinary utensil comprising a container having an open mouth, a support resiliently embracing the sides of the container and provided with a handle, a holder detachably connected to the support and extending upwardly therefrom to terminate in a circular looped upper end above and substantially concentric with the mouth of the container, and a conical fabric bag depending from said holder loop with its apex extending into the mouth of the container.

2. A culinary utensil comprising a container having an open mouth, a support resiliently embracing the sides of the container and provided with a handle, a holder detachably connected to the support and extending upwardly therefrom to terminate in a circular open looped upper end above and substantially concentric with the mouth of the container, and a conical fabric bag depending from said holder loop with its apex extending into the mouth of the container, the bag having a peripheral seam through which the loop may be threaded.

REX D. McDILL.